Aug. 6, 1935.  C. W. DAWSON  2,010,062
AUTOMATICALLY CONTROLLED FLUID PUMPING MECHANISM
Filed March 25, 1933   5 Sheets-Sheet 1

Charles W. Dawson INVENTOR
BY
G H Strickland ATTORNEY

Aug. 6, 1935.  C. W. DAWSON  2,010,062
AUTOMATICALLY CONTROLLED FLUID PUMPING MECHANISM
Filed March 25, 1933  5 Sheets-Sheet 3

Charles W. Dawson INVENTOR
BY
G. H. Strickland ATTORNEY

Patented Aug. 6, 1935

2,010,062

UNITED STATES PATENT OFFICE 2,010,062

AUTOMATICALLY CONTROLLED FLUID PUMPING MECHANISM

Charles Wesley Dawson, Dayton, Ohio

Application March 25, 1933, Serial No. 662,778

14 Claims. (Cl. 221—73.5)

My invention relates to automatically controlled fluid pumping mechanism and more specifically to automatically controlled tire inflating mechanism.

Heretofore in tire inflating mechanism it has been customary to maintain a supply of air under relatively high pressure and to control the delivery of air from said supply to the tire to be inflated by means of a valve automatically controlled by a device responsive to pressure on the discharge side of the valve within the tube or other conduit connecting the compressed air supply with the tire. Such mechanisms for automatically inflating tires, while operative to accomplish the desired purpose, have the disadvantage of operating with a pulsating action. That is to say, when the source of compressed air is connected to the interior of the tire, air is delivered thereto from the air supply intermittently by the repeated opening and closing of the automatic valve in rapid succession. This intermittent operation or pulsating effect is due to the building up of pressure in the delivery line to a point sufficient to close the automatic valve before the pressure within the tire itself has reached the pressure at which the valve is set to close.

Such tire inflating mechanisms have other disadvantages, chief among which are the tendency of the automatic valve to stick in either the open or closed positions, and the tendency to collect dirt and particularly condensed moisture both in the compressed air tank and the connections leading from the tank to the tire to be inflated.

My invention overcomes these objections to such prior tire inflating mechanisms by the elimination of the elements that have been directly responsible for prior difficulties, and has for its primary object the provision of mechanisms free of valves and compressed air tanks, for, instantly and automatically, upon the application of the delivery hose to the tire or other device to be inflated, supplying air in a continuous flow to build up any desired pressure within a device, such as a tire, to be inflated.

A further object of my invention is to provide a self contained, portable and unitary structure having embodied in a single small cabinet all the necessary elements for automatically inflating tires or the like.

Further objects of my invention include the provision of various novel elements comprising parts of my novel tire inflating mechanism; such as, for instance, a new and improved air delivery hose, a new and improved control mechanism including a new and improved electrical contact making and breaking device automatically operated when desired; a new and improved electrical circuit for the motor, and other and further objects that will become apparent from the specification and claims taken in conjunction with the drawings made a part hereof, wherein;

Speaking generally my invention comprises a compressor operatively connected to be driven by an electric motor. The compressor has its discharge side connected to a delivery hose which hose is adapted to be fitted upon the ordinary valve contained in the tire. Connected into this delivery hose is a pressure actuated device adapted to actuate an electrical switch to an open position to thereby open the motor circuit, the pressure actuating device being operative to close the said contacts as soon as the pressure within the delivery conduit or hose is relieved by the removal of the hose from the tire. Connected into the motor circuit is a second switch automatically closed whenever the delivery hose is attached to the valve of the tire to be inflated. By the provision of these switches in series it may be said that the device becomes automatically operative to deliver air under pressure by the closing of the hand operated switch or in other words, by the attachment of the hose to the tire, and becomes inoperative whenever the pressure within the line reaches that point at which the pressure actuated member opens the pressure switch.

These various elements are clearly indicated on the drawings wherein the numeral 10 indicates a cabinet having a base 11. Bolted or otherwise secured to the base 11 is a pair of standards 12 upon which standards is mounted a compressor 13. The compressor may of course be of any conventional design but is herein shown as a reciprocating pump or compressor, having the usual drive shaft 14 extending through the shaft seal 15 and having secured at its outer end, a pulley 16. Below the compressor 13 and also mounted on the base 11 is an electric motor 17 having the usual pulley 18 on the extremity of its armature shaft arranged to drive the compressor pulley 16 through the medium of the endless belt 19.

Although not shown on the drawings, the inlet to the compressor cylinder may be through the cylinder head or through the crankcase and piston in much the usual manner. The discharge of the compressor is connected to the delivery hose 21 which hose has at its outer end the customary chuck 22 comprising a fitting or socket adapted to engage the valve of the tire or other element to be inflated.

Means are provided for controlling the operation of the motor so that it will start when air is required, and stop when a sufficient quantity of air has been delivered to the tire. To this end the motor on one side is connected to the main line 25 and on its other side to the wire 26, which wire 26 is in turn connected to one contact 27 of switch 28. The other contact 77 of switch 28 is attached to wire 30 which in turn is attached to one contact 32 of switch 33 having its other contact 34 connected to the second main line 35.

Thus the motor circuit contains the two switches 28 and 33 connected in series so the circuit is opened by the opening of either switch but closed only by the closing of both.

Figures 1, 2:
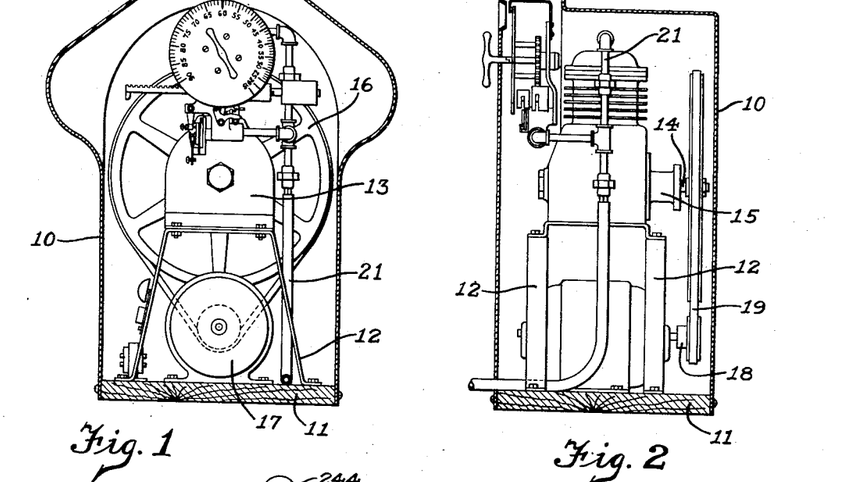
Fig. 1 is a sectional view through the cabinet showing in front elevation the apparatus contained therein.
Fig. 2 is a sectional view of the same cabinet but showing the contained apparatus in side elevation.
Figure 3:
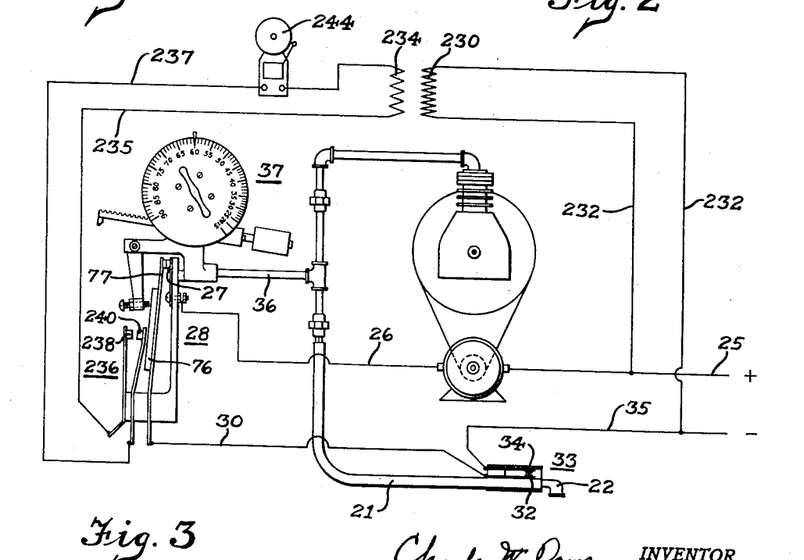
Fig. 3 is a wiring diagram of the electrical circuit.

Mechanism generally indicated at 37 on Fig. 3 automatically actuates the switch 28 to the open and closed position, and its operating member is exposed to the pressure within the delivery conduit 21 through the conduit 36.

Thus assuming that the mechanism is set for 60 pounds pressure as shown in Fig. 3, the switch 28 is closed due to the absence of pressure within the delivery tube 21. As soon as the tube 21 is picked up, the hand of the operator will close switch 33 causing current to flow and start the motor. Air is delivered under pressure until a pressure of 60 pounds is reached whereupon the switch 28 will open to stop the motor automatically.

Referring now to Figs. 4 to 8 inclusive, there is shown in detail the mechanism generally indicated at 37 (Fig. 3) for operating the switch 28. Broadly speaking this mechanism comprises a switch operating lever, operated through other levers by a pressure responsive motive element or diaphragm, together with latching and releasing means whereby the switch 28 is locked in the closed position until the pressure responsive member reaches one end of its stroke, and then locked in the open position until the rpessure responsive member reaches the other end of its stroke.

Specifically there is provided a casing 50 forming a chamber 51 exposed to pressure within the delivery tube 21 through the connection 36. Within chamber 51 is located a pressure responsive motor 52, herein shown as comprising a piston 53. On the lower end of the piston 53 is fastened a flexible washer 54 of leather or other suitable material having a cylindrical flange 55 engaging the inside of chamber 51 to prevent leakage of air between chamber 51 and piston 53. The washer 54 is held on the piston 53 by means of a retainer 56 through the center of which passes a screw 57 threaded into piston 53 as shown.

Extending upwardly from casing 50 is a pair of supporting arms 62 between which extend pivot pins 58. These pivot pins pass through a fulcrum member on frame 59 in which is slidably mounted a rack bar or lever 60 having rack teeth for a purpose hereinafter described. The fulcrum frame is received between the two supporting arms 62 for pivotal or oscillatory movement about pins 58. Carried on the outer end of the rack 60 is a weight 64 adapted to slide upon the lever 60 and adapted to be held in the desired position on the rack bar 60 by means of the screw 65. The weight 64 tends to hold the rack bar 60 and frame 59 in the position shown in Fig. 6 and in this position a stop pin 66 carried by the frame 59 rests upon the top of a bifurcated lug 67, the bifurcations of which slidingly embrace the frame 59. The lower end of lug 67 is attached to the top of piston 53 so that as the piston moves upwardly under the influence of pressure within chamber 51 the lug bearing against the stop pin 66 to thus move the frame 59 and consequently the rack 60 and weight 64 upwardly around the pivot pins 58.

Figure 4:
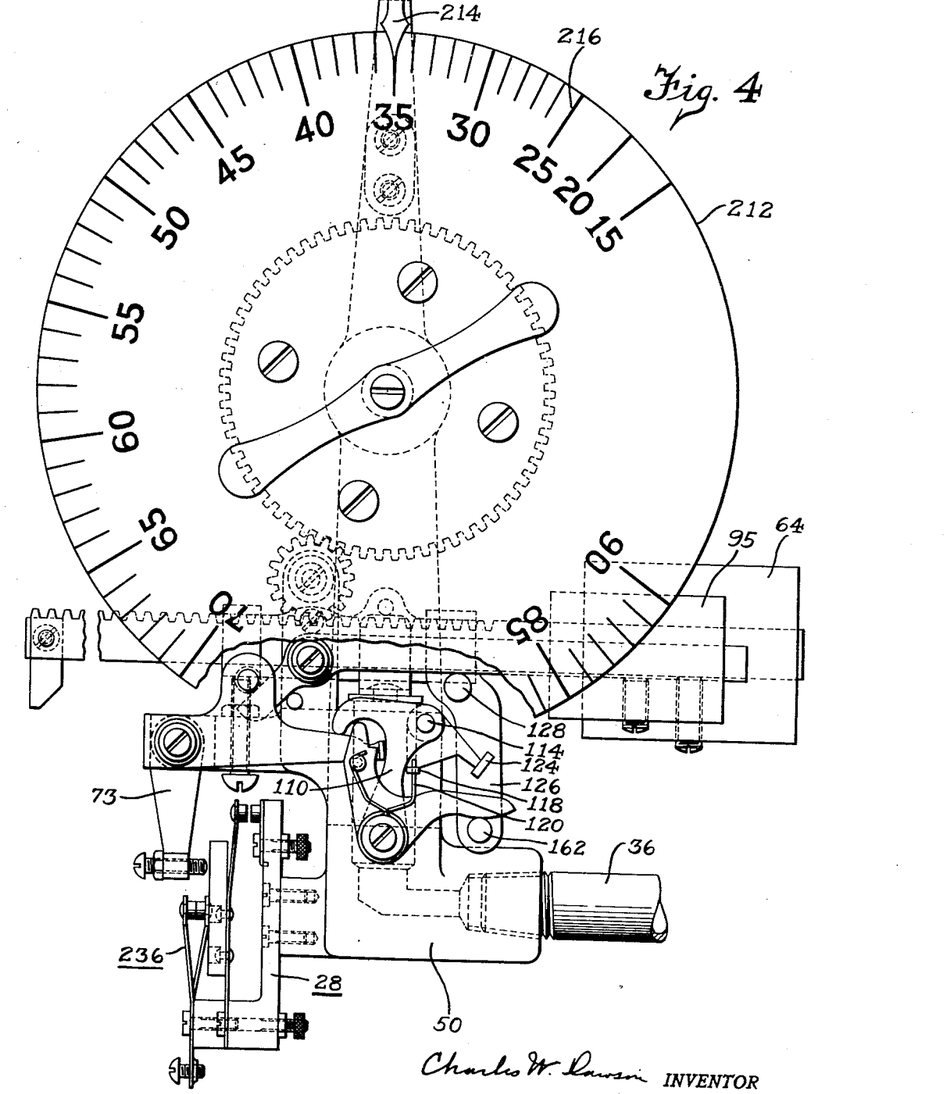
Fig. 4 is an enlarged front elevational view of the motor control apparatus, the parts being shown in the switch open position.
Figure 5:
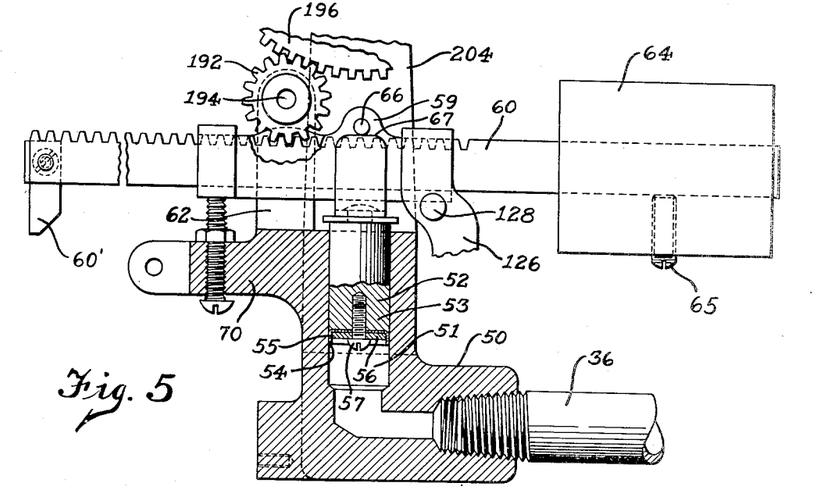
Fig. 5 is a detail partly in section and partly in elevation showing the details of the pressure responsive member.

A bracket 70 formed on the casing 50 carries a screw 71 on which is pivotally mounted a bell crank lever 72, the depending arms 73 of which carries an adjustable set screw 74 adapted to be locked in set position by a lock nut 75. The end of the screw 74 engages an insulating block 76 carried on a switch blade 77 mounted in the insulating frame 79 and secured thereto by means of the binding post 77' on the outer end of which is provided the knurled nut 79''. Wire 30, shown in Fig. 3 is, of course, attached to binding post 77'. Insulating frame 79 is attached to casing 50 by means of the screws 80. At the upper end of frame 79 is a metal piece 81 secured to the frame by a binding post 82 and the metal piece is provided with a contact point 83 adapted to engage a contact 84 carried on the blade 77. The blade 77 is of course biased to the open position so that when the set screw 74 is moved to the left by the movement of the bell crank lever 72, contact 84 likewise moves to the left. As shown in Fig. 4 the wire 26 is connected to the metal piece 81 by the post 82 and the wire 30 is connected to the blade 77 through the post 77' as previously described.

The means for moving the depending arm 73 to the right to close the contacts 83 and 84, or in other words to move the bell crank lever 72 in a counter-clockwise direction, comprises a lever 92 mounted on a pivot screw 93 projecting from one of the supporting arms 62. The lever 92 carries a slidable weight 95 adapted to be set in the desired position by a set screw 96. On its left hand end, lever 92 is provided with an arm 98 adapted to engage a pin 99 carried in a lug 100 formed on the horizontal arm 101 of bell crank lever 72.

Thus when weighted lever 92 moves downwardly, or in a clockwise direction around its pivot 93, the arm 98 engages pin 99 and moves the bell crank lever 72 in a counter-clockwise direction to thereby close contacts 83 and 84.

However, means are provided to hold the switch contacts 83 and 84 open until the weighted lever 92 has reached the limit of its downward motion, or in other words until the pressure responsive piston 53 has reached its lowermost position. To this end a holding lever 110 is mounted for oscillatory movement on a fulcrum pin 111 projecting from the casing 50. This lever 110 is provided with a nose 112 which rides on the upper side of the horizontal arm 101 so that when the device is in the position shown in Fig. 4 movement of the bell crank lever 72 to close the switch is prevented.

Figures 7, 8:
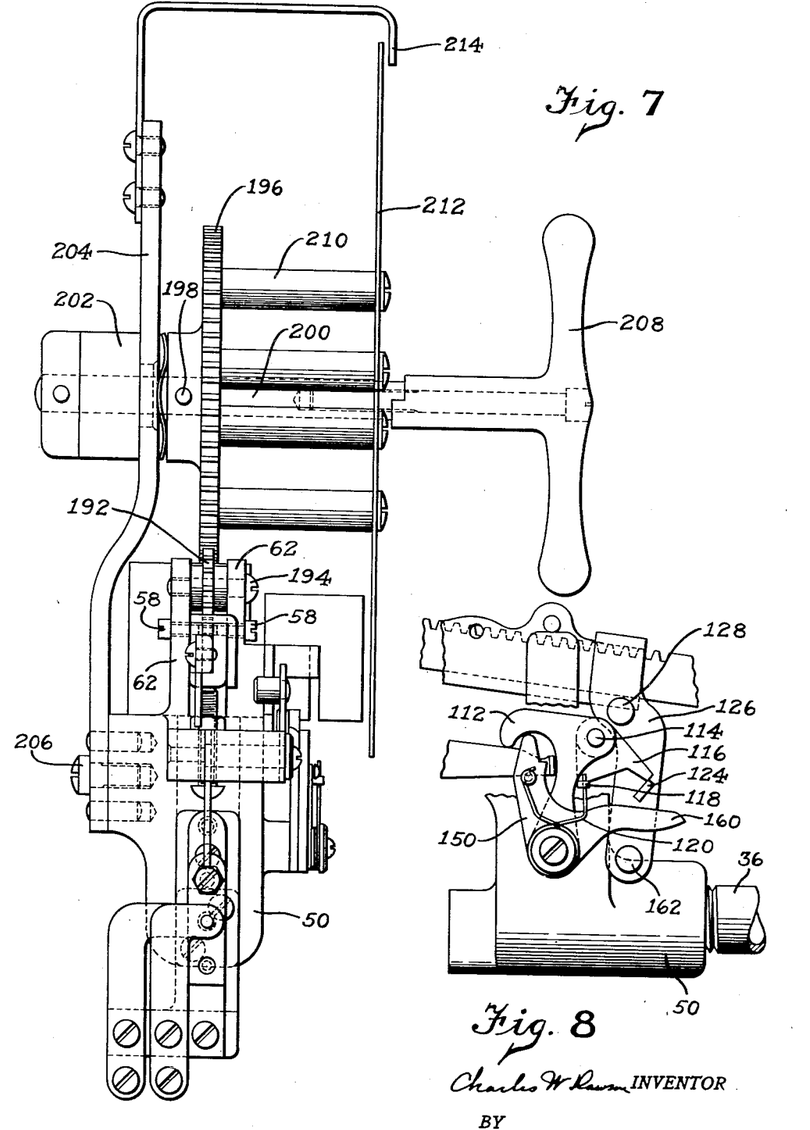
Fig. 7 is a view in side elevation of the control mechanism.
Fig. 8 is a detail in elevation of the locking mechanism showing the parts in position just after the main switch has opened.

Pivoted on the holding lever 110 by means of a small pivot pin 114 is a small detent lever 116. This detent lever 116 has an outturned projection 118 which, as shown in Figs. 4 and 8, engages an intermediate portion of lever 110. A spring 120 engages the projection 118 and exerts a pull on the said projection and consequently a pull on lever 110 tending to rotate both the lever 116 and lever 110 in a counter-clockwise direction around the pivot point 111. This movement of the lever 110 together with the lever 116 which it carries is at times prevented by means of a detent 124 carried on a depending arm 126 which arm is rigidly connected to the frame 59 carrying the rack bar or lever 60. The depending arm 126 carries an outwardly extending pin 128 adapted to bear against the under side of the bar 92 so that when the arm 126 moves upwardly it carries with it the bar 92. A stop pin 130 limits the upward movement of the bar 92.

During the upward movement of the fulcrum frame 59 and consequently similar upward movement of the depending arm 126, the detent 124 engages the extension 132 of the detent lever 116 to rotate the detent lever 116 slightly on its pivot point 114. This movement relieves the pull of spring 120 on the holding lever 110 by moving the projection 118. When the piston reaches the limit of its travel in the upward direction, however, the detent 124 slides under the projection 132, permitting the holding lever 110 to move under the pull of spring 120 to the position shown in Fig. 4. In this position the nose 112 of lever 110 has moved higher on the horizontal arm 101 of bell crank lever 72, moving the said bell crank lever 72, in a clockwise direction to open switch 28. In this position the switch 28 is locked in the open position, for the arm 98 of weighted lever 92 cannot rotate the bell crank lever 72 until the detent 124 is again released from the projection 132. Since detent 124 has an effective surface which is substantially a portion of an arc, the center of which is the pivotal pins 58 of frame 59, this detent is effective to hold the holding lever 110 in its switch open holding position until the piston has reached the lowermost point of its path of travel. Of course, when this occurs, detent 124 clears extension 132 and in this ineffective position permits the weight lever 92 to fall and the arm 98 to move the bell crank lever 72 to a position to close the switch 28.

Figure 6:
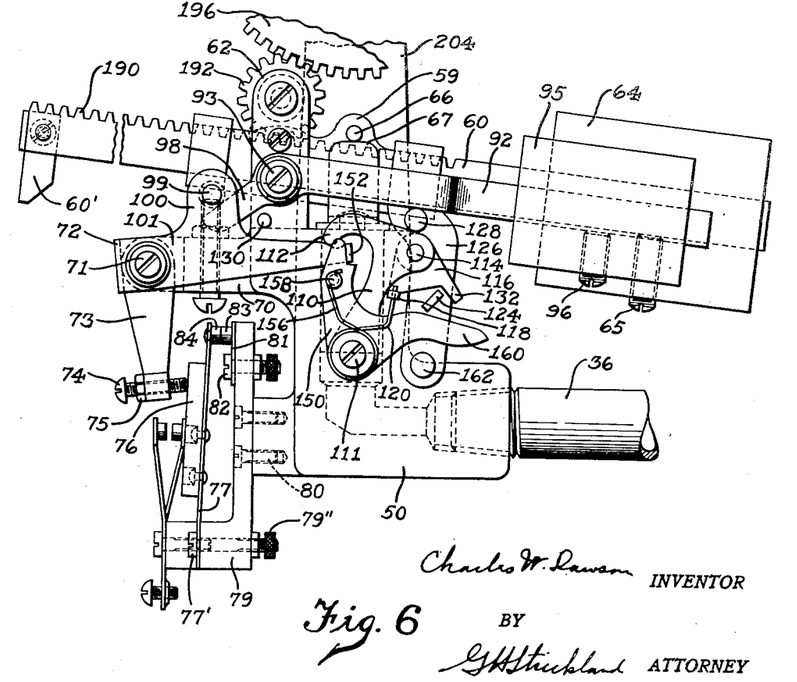
Fig. 6 is a view in front elevation of the control mechanism showing the switch in closed position.

Means are also provided for holding the switch 28 in its closed position until the piston has reached the uppermost point of its path of travel. To this end, latching means are provided, shown herein as comprising a latch lever 150 pivoted on pin 111 which also serves as the pivot pin for the holding lever 110. This latch lever 150 is provided with a latching surface engaging a projection 152 of horizontal arm 101 of bell crank lever 72 so that as shown in Fig. 6 clockwise movement of bell crank lever 72 is prevented. A wire spring 156, which may be a continuation of spring 120 engages a stud 158 on latch lever 150 so as to move or cause rotation of the latch lever to the latching position. Rigid with latch lever 150 is a releasing tail or trigger arm 160 below which is positioned a pin 162 carried by the depending arm 126 of the fulcrum frame 59. When the piston has reached the upper limit of its travel pin 162 engages tail 160 to release the latching means and thereby permit bell crank lever to move in a clockwise direction to open the switch 28.

Assuming therefore, that the device so far described is not in operation. Piston 53 is of course in its lowermost position due to the weight 64 acting through the bar 60 on the top of said piston. The operator then places the nipple 22 over the valve in the tire causing switch 33 to close. The compressor compresses air into the tire and as the pressure gradually builds up overcoming the force of weight 64 on the piston 53, the piston begins to rise. At the start of this operation the parts are in the position shown in Fig. 6, that is, the switch 28 is held in the closed position by the latching lever 150. Upward movement of piston 53 causes a counter-clockwise movement of fulcrum frame 59 on its pivot point 58. Since weighted lever 60 and the depending arm 126 are both carried by the frame 59, both of these elements move, the lever 60 in a counter-clockwise direction and the arm 126 upwardly. Upward movement of the arm 126 causes its integral pin 128 to rotate weighted lever 92 in a counter-clockwise direction, releasing pressure on the pin 99, and at the same time causes detent 124 to engage the extension 132 to relieve the pull of spring 120 on the holding lever 110.

When the piston has reached the limit of its upward direction, the following operations occur in rapid succession. The latching lever 150 is moved to the unlatching position by reason of pin 162 engaging tail 160 of the latch lever, thereby permitting the switch to open under the action of bell crank lever 72. Detent 124 is freed from the projection 132 so that spring 120 moves the holding lever in a counter-clockwise direction to hold the switch in the fully open position and to prevent the weighted lever 92 from moving downwardly due to the fact that arm 98 engages pin 99.

The elements remain in this position until the delivery tube is removed from the tire whereupon the pressure within the tube is released. Upon release of this air pressure the piston 53 falls under the weight of lever 60 but the switch 28 remains open until detent 124 releases projection 132 of detent lever 116. When this occurs, the weighted lever 92 overcomes the tension of spring 120 and moves, through its integral arm 98 acting on the pin 99, the bell crank lever in a counter-clockwise direction to close switch 28.

The weight 64, acting as it does against the upward movement of the piston 53, determines the point at which the switch 28 cuts out. Since it is desirable to have the cut-out variable, means are provided for adjusting the effect of the weight. To this end, the weight lever 60 is provided with teeth 190 adapted to be engaged by teeth of a small gear 192 rotatably mounted on a shaft 194 provided in the supporting arms 62. This gear 192 is manually rotated by a master gear 196, fixed by a pin 198 to a control shaft 200, the shaft 200 being mounted in a bearing 202 provided in a bracket 204 fixed to the rear of casing 50 by screws 206. The control shaft 200 extends forwardly and has connected to it a handle 208. Gear 196 has attached to it by suitable attaching means 210 a dial 212, and a pointer 214, having one end in the form of a pointer extending over the upper edge of the dial, is attached to the bracket 204. The dial 212 has suitable indications 216 therein. Rotation of the handle 208 through the gears 196 and 192 move the weight lever 60 in the frame 59. Movement of handle 208 will likewise rotate dial 212 so that the pressure required may be obtained by moving the dial to a position wherein the number representing the pressure desired falls directly beneath the pointer.

It should be understood that before being placed in operation, the apparatus is tested and adjusted so that the indications 216 when located beneath the pointer 214 give accurate indications of pressures required to overcome the weight.

In order to properly indicate to the operator when the desired pressure has been obtained within the tire being inflated, there is provided a signal, herein shown in the form of a bell, adapted to ring when the switch 28 is open. This device is shown in Fig. 3. A transformer 230 has its primary windings connected directly into the main current supply lines through the leads 232 and its secondary winding 234 connected through wires 235 and 237 to contacts 238 and 240 of the signal switch 236. Whenever switch 28 is open, which due to the natural bias of the blade 77 happens whenever the bell crank lever is removed in a clockwise direction, contacts 238 and 240 are closed. This occurs by reason of the movement of blade 77 to the left causing insulating block 76 to move contact 240 into engagement with contact 238.

Closing of contacts 238 and 240 causes current to flow through the secondary circuit thereby ringing bell 244. While this signal has been shown in the form of a bell, it should be understood that it could take any suitable form.

Figure 9:
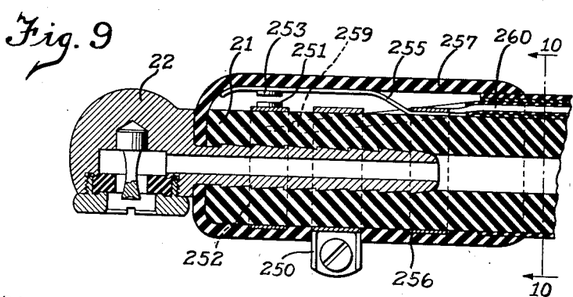
Fig. 9 is a longitudinal sectional view of one form of delivery conduit.
Figure 10:
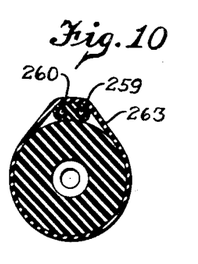
Fig. 10 is a section taken on the line 10—10 of Fig. 9.

In Figs. 9 and 10 I have shown one practical form of the switch 33 which has been described heretofore in connection with the diagrammatic Fig. 3. In this form the delivery hose 21 is clamped to the usual chuck or connecting element 22 by means of the annular clamp 250. A contact 251, corresponding to contact 32 of Fig. 3, is clamped securely to the hose 21 by means of the clamp 252. A second contact 253, corresponding to contact 34 of Fig. 3, is carried by the resilient blade 255 which blade is also clamped to the hose 21 by means of the clamp 256. Contact 253 is normally biased away from contact 251 by the natural spring action of blade 255 so that the contacts are closed only by force exerted against the contact 253 to overcome the spring action of the blade 255. An insulating jacket or coating 257 covers the contacts. Running lengthwise of the delivery hose 21 is a pair of conductors comprising the insulated wire 259 and the insulated wire 260. Wire 259 is connected to contact 251 while wire 260 is connected to contact 253. A wrapping 263 which may be cotton, electric tape or other similar material is wrapped around the conduit 21 and maintains the wire 259 and 260 in position.

With this form of delivery hose and switch, the contacts 251 and 253 are closed whenever the operator grasps the hose 21 substantially over the contacts and forces the chuck 22 into engagement with the tire valve.

Generally when handling a delivery hose connected to a tire inflating mechanism the operator will grasp the hose substantially close to the chuck 22. Generally, therefore, the switch contacts 251 and 253 will be closed when air is required.

However, to overcome the even slight uncertainty connected with the use of such a hand operated switch, I may use a form of switch that will automatically close as soon as the chuck is attached to the tire valve. For example in Figs. 10 and 11 the delivery hose is designated at 21' connected to the chuck 22' by the usual clamp 250'. In this modification the chuck comprises a metallic head portion 300 provided with the integral extension 301 extending into the delivery tube 21' and to which the delivery tube is secured.

Figure 11:
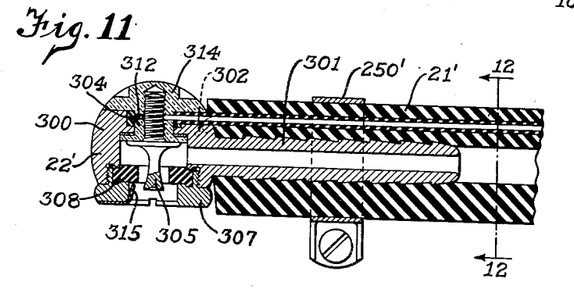
Fig. 11 is a longitudinal section of a modified form of delivery hose.

The metal head portion 300 is provided with an opening at its upper end and into this opening is plugged an insulating plug 304 into which is screw threaded the valve operating member 305.

At its lower end the head portion 300 is also provided with an opening into which is screw threaded the metal cap 307. An insulating ring 308 is clamped between the head 300 and the cap 307. Carried embedded in the tube 21' are two insulated wires 310 and 311. One of these wires, for example wire 311 is soldered directly to the metal head portion 300 at 302, while the other wire 310 is wound around the screw threaded valve operating member 305 as at 312, and is held firmly and securely against member 305 by means of the insulating cap 314 screw threaded onto the upper end of the member 305.

Thus metallic head portion 300 of the chuck 22' forms one contact while valve operating member 305 forms the second contact. Whenever the chuck 22' is placed over the valve stem of the tire to be inflated, the metal of the tire valve will bridge these contacts and thereby permit the passage of electric current. In order to insure such contact a spring clip 315 is provided.

In this modification the wires 310 and 311 may correspond directly to wires 30 and 35 of Fig. 3. That is, they may be connected directly into the usual 110 volt system. However, when using the chuck as the switch, we prefer to use it in a low voltage circuit as a means for energizing a solenoid which will in turn operate a main line switch corresponding to switch 33 of Fig. 3. For instance, in Fig. 13, the parts corresponding to Fig. 3 are indicated by the same reference characters primed. Therein we have shown the motor 17' connected on one side to the main line 25' and on its other side to the wire 26'. The wire 26' is connected to contact 400 of switch 401, while the other contact 402 is connected by means of wire 26'' to a contact 27' of switch 28' whose other contact 77' is connected to main wire 35'. In other words this circuit contains two switches in series as in Fig. 3, the opening of either one of which will break the motor circuit while closing of both is required to close the circuit.

In this circuit however, switch 401, corresponding to switch 33 of Fig. 3 is closed and opened by a solenoid 410. The solenoid 410 is part of a circuit including wires 411 and 412, and switch 413, the wires 411 and 412 being connected into the low voltage signal circuit as shown. Switch 413 is of course the chuck shown in Fig. 11 wherein the valve operating member 305 comprises one contact while the metal portion 300 comprises the other contact.

Figure 12:
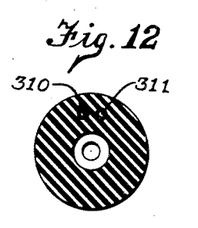
Fig. 12 is a section on the line 12—12 of Fig. 11.
Figure 13:
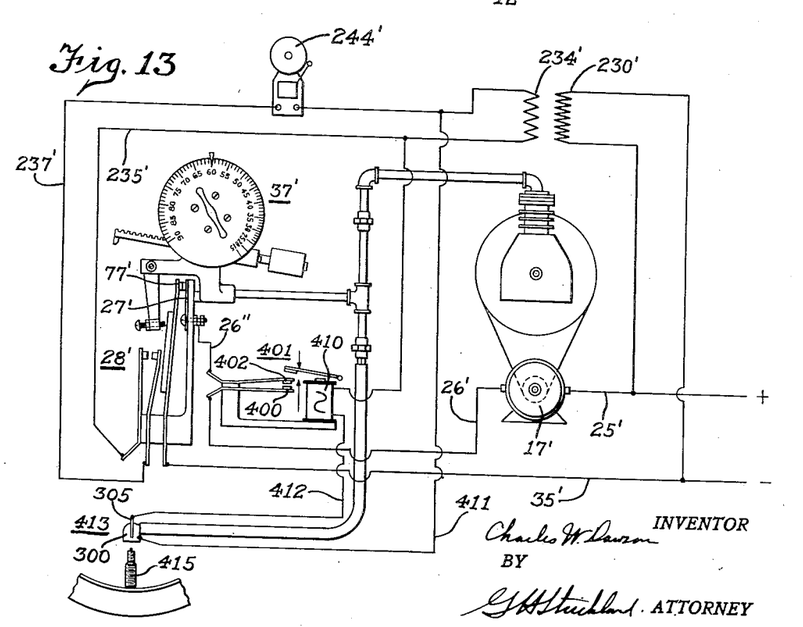
Fig. 13 is a diagrammatical view of a modified wiring system.

Thus in Figs. 11, 12 and 13 when the apparatus is idle, switch 28' is closed due to the effect of the weighted lever and switch 401 is open. When chuck 22 is placed over the tire valve 415, contacts 300 and 305 are bridged. Current flows through the solenoid circuit, thereby energizing solenoid 410 to close switch 401. Current then flows to motor 17' and the apparatus continues to function until the pressure within the tire reaches that at which the mechanism is set. Immediately this pressure is reached, switch 28' opens and the operation of the apparatus is discontinued.

My apparatus is therefore fully automatic, rapid and sure in operation. While in Figs. 11 and 12 the lead wires are shown embedded in the delivery tube, it should be understood that they could be arranged as in Figs. 9 and 10 or arranged in any other convenient manner.

In the modifications shown, the dial and lever 60 are calibrated in such a manner that the machine is automatic between 15 and 90 pounds. Above 90 pounds the device operates continuously because when the lever 60 is in its extreme right hand position, the lug 60' moves to a position directly above the bell crank lever 72 so as to prevent a clockwise movement of bell crank lever 72. The contacts 83 and 84 are therefore held in closed position and the pump operates until the air delivery hose is removed from the tire.

The weight or the length of bar 60, may of course be changed to vary the range over which the apparatus operates automatically.

Further, if desired, an oil separator may be located on the discharge side of the pump to intercept and remove any oil that may possibly be carried in the compressed air. In this case it would be advisable to connect the separator so that oil separated from the air, would return to the pump.

While the form of embodiment of the invention as herein disclosed, constitutes a preferred form, it is to be understood that other forms might be adopted, all coming within the scope of the claims which follow.

What is claimed is as follows:

1. Tire inflating mechanism comprising a cabinet, a compressor within said cabinet, a motor within said cabinet and connected to drive said compressor, means for delivering compressed air from said compressor to the tire to be inflated, means within said cabinet and responsive to pressure within said delivering means for automatically stopping the compressor and means for automatically starting said compressor, said last named means being rendered operative by connecting the delivering means to the tire to be inflated.

2. Tire inflating mechanism comprising a compressor, a motor for driving said compressor, means for delivering compressed air from said compressor to the tire to be inflated, an electrical circuit for said motor and a plurality of switches in series in said motor circuit, one of said switches being responsive to pressure within the said delivery means for stopping the mechanism and another of said switches being automatically controlled by the attachment of the delivering means onto the tire to be inflated for starting the mechanism.

3. Tire inflating mechanism comprising a compressor, a motor connected to drive said compressor, means for automatically starting said compressor, said means being rendered operative by connecting the tire inflating mechanism to the tire to be inflated and means for automatically stopping said compressor when the desired pressure has been reached within the tire to be inflated.

4. Tire inflating mechanism comprising a cabinet, a motor-compressor unit within said cabinet, means for delivering air from said compressor to the tire to be inflated, control means within said cabinet for stopping the operation of said motor-compressor unit whenever the desired pressure is reached within the tire and means for starting the operation of said motor-compressor unit, said last named means being rendered operative by connecting the delivering means to the tire to be inflated.

5. Tire inflating mechanism comprising a motor-compressor unit, means for delivering air from said unit to the tire to be inflated and means for automatically starting said motor-compressor unit whenever said delivering means is connected to the tire.

6. In tire inflating mechanism a source of compressed air, means for delivering compressed air from said source to the tire to be inflated comprising a hose, and a plurality of stationary switch contacts embedded in said hose, said contacts being so arranged as to be bridged for the passage of an electrical current whenever said hose is attached to the tire to be inflated.

7. In tire inflating mechanism, a source of compressed air, means for delivering air from said source to the tire to be inflated comprising a hose, stationary electrical contacts carried by said hose, said contacts being so arranged as to be bridged for the passage of an electric current when said hose is attached to the tire to be inflated.

8. Tire inflating mechanism comprising a motor-compressor unit, means for delivering air from said unit to the tire to be inflated, means for automatically starting said motor-compressor unit when the delivering means is connected to said tire to be inflated, and means for automatically stopping the operation of said motor-compressor unit whenever the pressure within said tire reaches a predetermined value and signalling means for indicating that the motor-compressor unit has stopped.

9. A tire inflating mechanism including a plurality of switches in series relation, one of said switches being closed by the connection of the mechanism to the tire to be inflated to thereby start the mechanism and the other of said switches being opened by a predetermined pressure within the tire to thereby stop the operation of the mechanism.

10. Tire inflating mechanism comprising a source of compressed air, means for delivering air from said source to the tire to be inflated, means for automatically starting the flow of air through said delivery means, said last named means including a plurality of electrical contacts carried by the delivery means and adapted to be bridged when the delivery means is attached to the tire to be inflated.

11. Tire inflating mechanism comprising a motor-compressor unit, means for delivering air from said unit to the tire to be inflated, means for automatically starting said motor-compressor unit whenever said delivery means is connected to the tire, said last named means including a plurality of electrical contacts carried by said delivery means.

12. Tire inflating mechanism comprising a source of compressed air, a conduit for delivering compressed air from said source to the tire to be inflated, means for automatically starting the flow of air from said source to said conduit whenever said conduit is connected to the tire, said last named means including a plurality of electrical contacts carried by the conduit.

13. Tire inflating mechanism comprising a source of compressed air, a conduit for delivering compressed air from said source to the tire to be inflated and electrical means operated automatically by connecting the conduit to the tire to be inflated for starting the flow of air to the conduit from the said source.

14. Tire inflating mechanism comprising a source of compressed air, a conduit connecting said source to the tire to be inflated, said conduit being open to atmosphere when disconnected from the tire whereby air contained therein is at atmospheric pressure, and means automatically operated by connecting the conduit to the tire to start the flow of compressed air from said source to said conduit.

CHARLES WESLEY DAWSON.